ized Patent

(12) United States Patent
Cape et al.

(10) Patent No.: US 9,482,792 B2
(45) Date of Patent: Nov. 1, 2016

(54) SECURITY DEVICE FOR PROJECTING A COLLECTION OF SYNTHETIC IMAGES

(71) Applicant: Visual Physics, LLC, Alpharetta, GA (US)

(72) Inventors: Samuel M. Cape, Woodstock, GA (US); Benjamin Bleiman, New Fairfield, CT (US)

(73) Assignee: Visual Physics, LLC, Alpharetta, GA (US)

( * ) Notice: Subject to any disclaimer, the term of this patent is extended or adjusted under 35 U.S.C. 154(b) by 70 days.

(21) Appl. No.: 14/394,903

(22) PCT Filed: Apr. 24, 2013

(86) PCT No.: PCT/US2013/037978
§ 371 (c)(1),
(2) Date: Oct. 16, 2014

(87) PCT Pub. No.: WO2013/163287
PCT Pub. Date: Oct. 31, 2013

(65) Prior Publication Data
US 2015/0070350 A1  Mar. 12, 2015

Related U.S. Application Data

(60) Provisional application No. 61/637,990, filed on Apr. 25, 2012.

(51) Int. Cl.
*G02B 3/00* (2006.01)
*G02B 27/06* (2006.01)
*G02B 27/22* (2006.01)
*B42D 25/29* (2014.01)

(Continued)

(52) U.S. Cl.
CPC ............. *G02B 3/0056* (2013.01); *B42D 25/00* (2014.10); *B42D 25/29* (2014.10); *B42D 25/355* (2014.10); *G02B 27/06* (2013.01); *G02B 27/2214* (2013.01); *G06T 11/001* (2013.01); *B42D 2035/20* (2013.01); *B42D 2035/24* (2013.01); *B42D 2035/26* (2013.01)

(58) Field of Classification Search
None
See application file for complete search history.

(56) References Cited

U.S. PATENT DOCUMENTS 7,333,268 B2   2/2008   Steenblik et al.
7,468,842 B2  12/2008   Steenblik et al.
(Continued)

FOREIGN PATENT DOCUMENTS

EP   2338692   6/2011
EP   2162294   3/2012
(Continued)

*Primary Examiner* — Said Broome
(74) *Attorney, Agent, or Firm* — Holland & Bonzagni, P.C.; Mary R. Bonzagni, Esq.

(57) ABSTRACT

A security device for projecting a collection of synthetic images as well as a computer-implemented method for producing such a security device are provided. The synthetic images may represent different viewpoints of a target object or image that change from one viewpoint image to another viewpoint image as the location of the observer changes relative to the device. The nature of each synthetic image can, however, be completely arbitrary, much like the images that are provided by a display device such as a television or computer monitor. In an exemplary embodiment, a special symmetry is used to generate the synthetic images, which allows the device to be manufactured without regard for registration.

30 Claims, 14 Drawing Sheets

(51) Int. Cl.
    *B42D 25/355*     (2014.01)
    *B42D 25/00*     (2014.01)
    *G06T 11/00*     (2006.01)

(56) References Cited

U.S. PATENT DOCUMENTS

| | | |
|---|---|---|
| 7,738,175 B2 | 6/2010 | Steenblik et al. |
| 7,830,627 B2 | 11/2010 | Commander et al. |
| 8,149,511 B2 | 4/2012 | Kaule et al. |
| 8,400,495 B2 | 3/2013 | Kaule |
| 8,632,100 B2 | 1/2014 | Kaule et al. |
| 2005/0152040 A1 | 7/2005 | Goggins |
| 2010/0177094 A1 | 7/2010 | Kaule et al. |
| 2010/0182221 A1 | 7/2010 | Kaule et al. |
| 2010/0194532 A1 | 8/2010 | Kaule |
| 2010/0208036 A1 | 8/2010 | Kaule |
| 2011/0179631 A1 | 7/2011 | Gates et al. |
| 2011/0234807 A1* | 9/2011 | Jones ............... G08B 13/19641 348/159 |

FOREIGN PATENT DOCUMENTS

| | | |
|---|---|---|
| WO | WO 2011/044704 | 4/2011 |
| WO | WO 2011/122943 | 10/2011 |

* cited by examiner

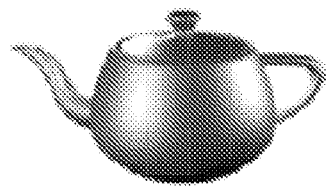
FIG. 13
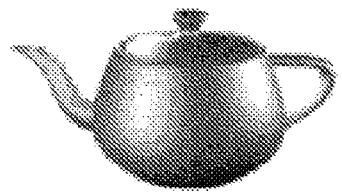
FIG. 14
| Grayscale Level | 0% | 25% | 50% | 75% | 100% |
|---|---|---|---|---|---|
| VI-Pixel | ☐ | ▧ | ▨ | ▩ | ■ |
| Example Lens Cluster | ○○○○ | ●○○○ | ●●○○ | ●●●○ | ●●●● |
FIG. 15
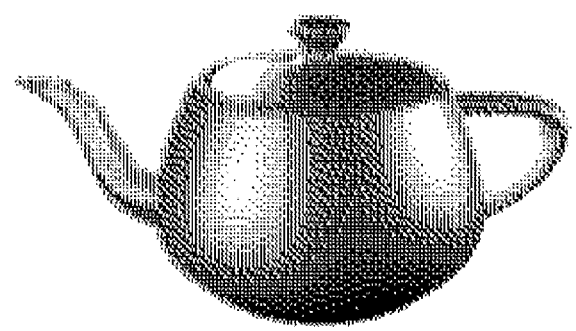
FIG. 16

SECURITY DEVICE FOR PROJECTING A COLLECTION OF SYNTHETIC IMAGES

RELATED APPLICATION

This application claims priority to U.S. Provisional Patent Application Ser. No. 61/637,990, filed Apr. 25, 2012, which is incorporated herein in its entirety by reference.

TECHNICAL FIELD

The present invention generally relates to a security device for projecting a collection of synthetic images, and to a computer-implemented method for producing such a security device.

BACKGROUND AND SUMMARY OF THE INVENTION

Micro-optic film materials projecting synthetic images generally comprise (a) a light-transmitting polymeric substrate, (b) an arrangement of micro-sized image icons located on or within the polymeric substrate, and (c) an arrangement of focusing elements (e.g., microlenses). The image icon and focusing element arrangements are configured such that when the arrangement of image icons is viewed through the arrangement of focusing elements, one or more synthetic images are projected. These projected images may show a number of different optical effects.

Material constructions capable of presenting such effects are described in U.S. Pat. No. 7,333,268 to Steenblik et al., U.S. Pat. No. 7,468,842 to Steenblik et al., U.S. Pat. No. 7,738,175 to Steenblik et al., U.S. Pat. No. 7,830,627 to Commander et al., U.S. Pat. No. 8,149,511 to Kaule et al.; U.S. Patent Application Publication No. 2010/0177094 to Kaule et al.; U.S. Patent Application Publication No. 2010/0182221 to Kaule et al.; European Patent No. 2162294 to Kaule et al.; and European Patent Application No. 08759342.2 (or European Publication No. 2164713) to Kaule et al.

These film materials may be used as security devices for authentication of banknotes, secure documents and products. For banknotes and secure documents, these materials are typically used in the form of a strip or thread and either partially embedded within the banknote or document, or applied to a surface thereof. For passports or other identification (ID) documents, these materials could be used as a full laminate or embedded as an anti-counterfeit feature in polycarbonate passports.

The prior art film materials described above, which are known as moiré magnifiers, generally start with a two-dimensional (2D) array of identical image icons. They may, however, also start with image icons that are altered or modulated in ways that provide different effects such as changing images or images that slowly rotate, etc. For three-dimensional (3D) effects, these film materials are constructed using a "bottom-up" approach in the sense that the view of a static object from the perspective of each individual lens is calculated spatially from a model of a static 3D object, and the corresponding icon is generated from the collection of the lens' views. Using this approach, each icon is calculated individually based on the static model of the 3D object. The approach has at least the following limitations:

(a) The finished synthetic image is only a static 3D object;
(b) The finished synthetic image will have a "snap" in the field of view; and
(c) The finished synthetic image is limited to a palette of at most one color, and furthermore one tone of that color. It is a binary image, and does not have any shading or grayscale.

The term "snap", which will be described in more detail below, constitutes a large discontinuity in what the observer sees when the observer moves outside of the device's range (but within its field of view) and looks at the device.

The drawbacks noted above are addressed by exemplary embodiments of the present invention, which use a "top-down" approach in the sense that each desired complete synthetic image as seen by an observer from all given viewpoints is defined, and then each of these individual images (which is different from spatial information) that correspond to the different viewpoints is processed and then used to define a part of what each lens sees. The sum total of all of these viewpoint images will ultimately define a significant portion of the image plane that would normally contain only icons ("image layer"). This approach will allow for the following major improvements over the prior art:

(a) The finished synthetic image can be, among other things: a moving 3D object; a dynamic (morphing or transforming) 3D object; a dynamic design of curves, abstract designs, shapes, photographs, 3D objects and images;
(b) The finished synthetic image can be designed such that there is no "snap" in the field of view;
(c) The finished synthetic images can include "halftone" effects similar to grayscale dithering. Furthermore, this method will help enable the coordination of several layers to ultimately produce synthetic images that incorporate full color dynamic designs and 3D images; and
(d) The finished synthetic images do not have to be sourced from models of 3D objects. The synthetic images can originate from any type of digital image (e.g., photographs, drawings, mathematical plots and curves, etc.).

The present invention specifically provides a security device for projecting a collection of synthetic images, which comprises: a collection of focusing elements, with each focusing element having an optical footprint; and at least one image layer, the focusing elements and image layer(s) together projecting a different image as the device is viewed at different angles, wherein, the image layer(s) is made up of an array of discrete digitized domains, each domain constituting an identical or substantially identical subset of each focusing element's optical footprint, the domains being discrete in that no two subsets overlap and every point in each subset is closest to its respective focusing element, each domain being divided into a number of discrete pixels equal to the number of images, wherein, each image is processed digitally, the number of pixels in each digitally processed image being equal or proportionate to the total number of focusing elements, the pixels in each digitally processed image being distributed to the same location within each digitized domain, such that each location within one digitized domain is marked with the color of a pixel from a different digitally processed image, allowing for the device to project a different image as the device is viewed at different angles.

In the following write-up, the inventive device is described as a device that projects synthetic images which are seen by an observer. There is a correspondence between the location of the observer relative to the device and the synthetic image that the observer sees from any particular viewpoint. For example, the synthetic images may represent different viewpoints of a target object or image that change from one viewpoint image to another viewpoint image as the location of the observer changes relative to the device. The nature of each synthetic image can, however, be completely arbitrary, much like the images that are provided by a display device such as a television or computer monitor. Moreover, in an exemplary embodiment, a special symmetry is used to generate the synthetic images, which allows the device to be manufactured without regard for registration, which is a known problem with prior art devices.

In contrast to a moiré magnifier, which has an array of more or less 'continuous' images, an exemplary embodiment of the image layer(s) in the security device of the present invention is a binary grid of distributed digital images where each pixel in the grid is either "on or off" (i.e., colored or uncolored).

In a first exemplary embodiment, the inventive security device projects a collection of grayscale or halftone synthetic images. In this embodiment, grayscale is implemented using grayscale images with reduced color palettes (e.g., four shades of gray) and focusing element clustering (i.e., a cluster of focusing elements instead of one focusing element is used for each viewpoint image-pixel).

In a second exemplary embodiment, the inventive security device projects a collection of 3D synthetic images. In this embodiment, the viewpoint images are related in such a way that an observer sees at least two different 2D images at one time, which produce binocular stereopsis perception of the images in the observer.

In a third exemplary embodiment, the inventive security device projects a collection of synthetic images that have no snap. More specifically, each distributed viewpoint image is a composite viewpoint image prepared by using one or more continuous mathematical scalar functions to define or alter a quantifiable parameter in the viewpoint image.

The present invention further provides a computer-implemented method for producing a security device for projecting a collection of synthetic images, wherein the security device is made up of a collection of focusing elements in the form of a focusing element sheet, each focusing element having an optical footprint; and at least one image layer, the focusing elements and image layer(s) together projecting a different viewpoint image as the device is viewed at different angles, the method comprising:

(a) forming the image layer(s) by:
(i) compiling a collection of different raw viewpoint images with each raw viewpoint image prescribing what an observer should see when viewing the security device from a given angle;
(ii) choosing a domain for each focusing element in the focusing element sheet, and arranging the domains in the form of a grid on or within the image layer(s), the domains constituting identical subsets of each of the focusing element's optical footprints such that no two subsets overlap and every point in each subset is closest to its respective focusing element once the image layer(s) is placed in a focal plane of the collection of focusing elements, wherein exact registration between the domains and the focusing elements is not required;
(iii) digitizing each chosen domain by dividing each domain into a number of discrete pixels, which will each represent a portion of a different viewpoint image, the number of pixels in each digitized domain being equal to the number of different viewpoint images, the digitized domains forming a raster grid;
(iv) digitally processing each of the different raw viewpoint images to form binary images, wherein the number of pixels in each digitally processed viewpoint image is equal to (or proportionate to) the total number of focusing elements in the focusing element sheet that will be used to represent the desired complete image;
(v) distributing the collection of different processed viewpoint images into the raster grid by marking each digitized domain pixel with the color of the corresponding viewpoint image pixel through a process called 'distribution', which involves assigning an address to each pixel in each digitized domain, and then assigning one image to each pixel having the same address in each digitized domain, such that each location within one digitized domain will be marked with the color of a pixel from a different processed viewpoint image; and
(b) placing the formed image layer(s) in a focal plane of the focusing element sheet.

Also provided by way of the present invention is a security device prepared in accordance with this method.

In a first exemplary embodiment, the inventive method produces a security device that projects a collection of grayscale or halftone synthetic images. More specifically, the "compiling" step when forming the image layer(s) of the inventive method is directed toward a collection of different raw grayscale or halftone viewpoint images, while the "processing" step involves modifying the raw viewpoint images by reducing the number of shades of gray in each image's color palette, optionally dithering the remaining shades of gray in each image's color palette, and then representing each such processed viewpoint image as a finished binary image. After distributing the collection of different finished binary images into the raster grid, the inventive method in this first exemplary embodiment further comprises using a cluster of focusing elements (e.g., a 2×2 cluster of lenses) for each viewpoint image-pixel.

In a second exemplary embodiment, the inventive method produces a security device that projects a collection of 3D synthetic images. More specifically, the "compiling" step when forming the image layer(s) of the inventive method involves modeling an object in a 3D-graphics rendering program and obtaining different raw viewpoint images of the object by rendering views of the object using a (virtual or real) camera at multiple positions, a one-to-one correspondence existing between the number of views rendered by the camera and the number of pixels in each digitized domain.

In a third exemplary embodiment, the inventive method produces a security device that projects a collection of synthetic images that have no snap. More specifically, the inventive method further comprises: determining mathematical scalar functions of x and y that are continuous; applying one or more such mathematical scalar functions to copies of the domain to obtain one or more scalar values, the domain constituting a region on the xy plane that has been repeated in a spatially periodic sense; and using the one or more scalar values to define or alter a quantifiable parameter in the collection of viewpoint images distributed to the domains, thereby generating composite viewpoint images.

The present invention further provides sheet materials and base platforms that are made from or employ the inventive security device, as well as documents made from these materials. The term "documents", as used herein designates documents of any kind having financial value, such as banknotes or currency, and the like, or identity documents, such as passports, ID cards, driving licenses, and the like, or other documents, such as tags or labels. The inventive security device is also contemplated for use with consumer goods as well as bags or packaging used with consumer goods, such as potato chip bags.

Other features and advantages of the invention will be apparent to one of ordinary skill from the following detailed description and accompanying drawings.

Unless otherwise defined, all technical and scientific terms used herein have the same meaning as commonly understood by one of ordinary skill in the art to which this invention belongs. All publications, patent applications, patents and other references mentioned herein are incorporated by reference in their entirety. In case of conflict, the present specification, including definitions, will control. In addition, the materials, methods, and examples are illustrative only and not intended to be limiting.

BRIEF DESCRIPTION OF THE DRAWINGS

The present disclosure may be better understood with reference to the following drawings. Components in the drawings are not necessarily to scale, emphasis instead being placed upon clearly illustrating the principles of the present disclosure. While exemplary embodiments are disclosed in connection with the drawings, there is no intent to limit the present disclosure to the embodiment or embodiments disclosed herein. On the contrary, the intent is to cover all alternatives, modifications and equivalents.

Particular features of the disclosed invention are illustrated by reference to the accompanying drawings in which:

FIG. 13 is a perspective view of a raw image of the Utah teapot or Newell teapot, which is used as a viewpoint image in an exemplary embodiment of the present invention;

FIG. 14 is a perspective view of a processed image of the teapot shown in FIG. 13 in which dithering was applied using four shades of gray;

FIG. 15 is a pictorial representation of the lens clustering scheme for four grayscale levels used in an exemplary embodiment of the present invention;

FIG. 16 is a perspective view of a final binary projected image of the teapot shown in FIG. 13;

FIG. 35 illustrates how the cubes shown in FIG. 34 move as the viewer moves from left to right, while

DETAILED DESCRIPTION OF THE INVENTION

Focusing elements used in the present invention serve to highlight, magnify, illuminate, or accentuate a small point in the image layer(s). Suitable focusing elements include, but are not limited to, lenses (e.g., microlenses), holes in a dot screen, focusing reflectors, zone plate lenses, buried lenses, objects with specular highlights, and the like.

Figure 1:
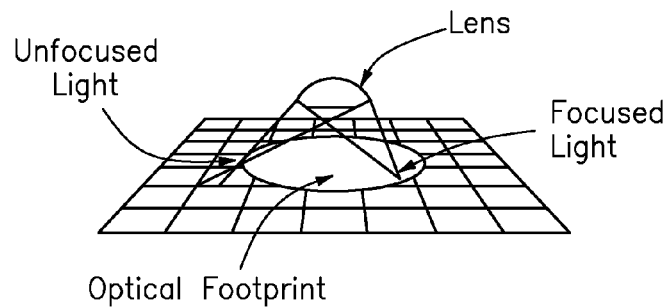
FIG. 1 illustrates a lens with its optical footprint.

By way of technical background, for exemplary embodiments of the inventive security device that employ microlenses, each lens is able to project the entire image contained within its so-called "optical footprint". As best shown in FIG. 1, an individual lens' optical footprint is defined as the collection of every point on the image layer(s) that can be focused upon by the lens. This optical footprint is limited in size by, among other things, the lens' coma, geometry and f-number (i.e, focal length divided by lens diameter), the material properties of the lens, the presence of an optical spacer or separator (or lack thereof), and the thickness of the image layer(s).

Figure 2:
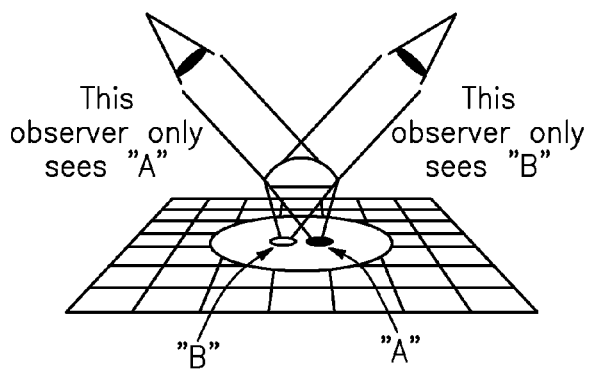
FIG. 2 illustrates the perception of stationary observers relative to the lens' optical footprint shown in FIG. 1.
Figure 3:
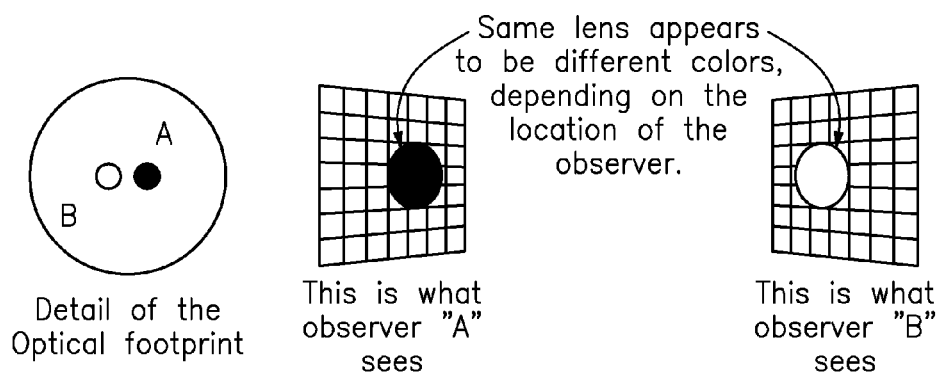
FIG. 3 illustrates the sampling property of lenses and in particular illustrates, in a first frame, an optical footprint of a lens with a colored image portion A and a colorless image portion B, and in a second frame, what an observer sees when positioned at the two different locations shown in FIG. 2.

The perception of a stationary observer relative to a lens' optical footprint is shown in FIG. 2, the stationary observer seeing the lens as though it were representing a very highly magnified version of a very tiny subset of its optical footprint (e.g., colorless subset "B" or colored subset "A"). In particular, the observer does not see an entire image in the lens, but instead sees those image portions located at the focal point of the lens. As best shown in FIG. 3, the subset and thus color that is observed depends upon the location of the observer and, consequently, which bundle of collimated light the observer's eye is receiving. The act or process by which small portions of a lens' optical footprint are observed as the location of an observer changes is called "sampling".

In general, if the lenses are sufficiently small, and the observer is sufficiently far away, the security device of the present invention may be characterized by the following statement:

An observer, looking through the collection of lenses that focus on the image layer(s) from a static viewpoint, sees that each lens is sampling the same place in each of the lens' respective optical footprints simultaneously.

Figure 4:
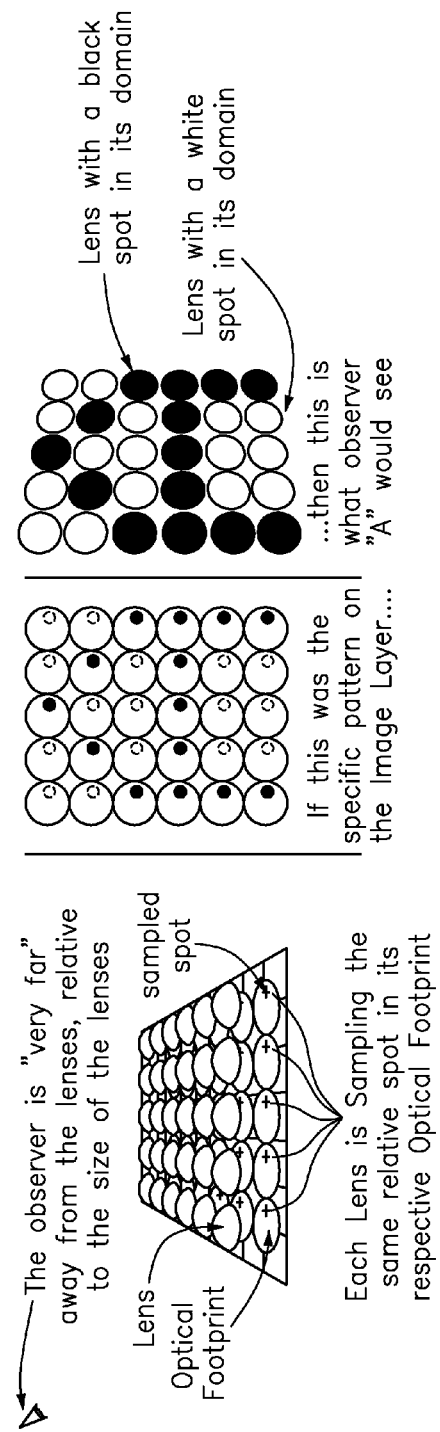
FIG. 4 illustrates, in a first frame, an array of lenses in combination with their optical footprints, with an observer positioned "very far" away at a first angle relative to the inventive device, in a second frame, a pattern in the image layer drawn among the lens' optical footprints, and in a third frame, what the observer would see when viewing the device.

FIG. 4 illustrates the concept described in the above statement. The leftmost or first frame of this figure shows an array of lenses in combination with their optical footprints, which are shown here as being circular. An observer is shown as being very far away from the lenses relative to the size of the lenses, which means that the angle from the normal of the lens plane to the observer is essentially the same for each lens. As a result, the observer sees each lens sampling the same place in its optical footprint (i.e., the point halfway between the rightmost part of the circular optical footprint and the center of the circle). The middle or second frame of this figure shows a pattern in the image layer, drawn among the lens' optical footprints. The rightmost or third frame of this figure shows what the observer viewing the device would actually see.

Figure 5:
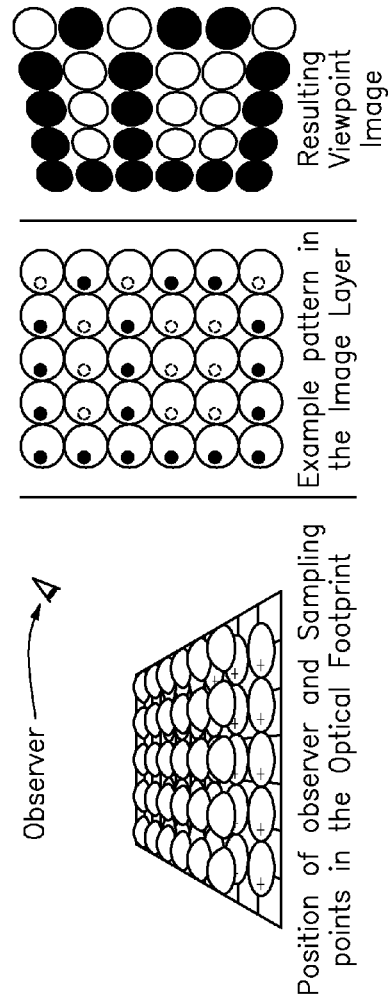
FIG. 5 illustrates, in a first frame, an array of lenses in combination with their optical footprints, with an observer positioned "very far" away at a different angle relative to the position of the observer in FIG. 4, in a second frame, a pattern in the image layer drawn among the lens' optical footprints, and in a third frame, what the observer would see when viewing the device.

FIG. 5 also illustrates the concept described in the above statement. In the first frame, the observer is shown at a different angle relative to the position of the observer in FIG. 4, which means that the observer is seeing a sampling point that has shifted to the left. The second frame of this figure shows a different pattern in the image layer, with the third frame of this figure showing what the observer viewing the device would actually see.

Figure 6:
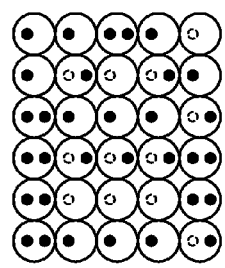
FIG. 6 illustrates the image layers of FIGS. 4 and 5 when superposed one on top of the other.

As best shown in FIG. 6, the different patterns shown in FIGS. 4 and 5 can be superimposed to form an image layer where an observer who views it through the collection of lenses would see image "A" from one angle, and image "B" from a different angle. The image that an observer sees from a given angle is hereinafter referred to as the viewpoint image. The collection of all viewpoint images that can be seen by an observer from an image layer can be coordinated to form many effects, perceived objects, and movements that have advantages over the optical effects demonstrated by prior art micro-optic security devices.

As seen from the above description, the subject invention enables the formation of an image layer that, which placed in the focal plane of the lenses in correct orientation, projects a collection of viewpoint images. As previously mentioned, these viewpoint images may represent, stationary or static, moving, or dynamic (e.g., morphing or transforming) 3D objects or images, a dynamic design of curves, abstract designs, shapes, photographs, and the like. These viewpoint images do not have to be sourced from models of 3D objects or images, but instead can originate from any type of digital image such as photographs, drawings, mathematical plots and curves, etc. The viewpoint images can include "halftone" effects similar to grayscale dithering, and can be designed such that there is no "snap" in the field of view.

As also mentioned above, the security device of the present invention comprises: a collection of focusing elements; and at least one image layer, the focusing elements and image layer(s) together projecting a different viewpoint image as the device is viewed at different angles.

The image layer(s) is made up of an array of discrete digitized domains, each domain constituting an identical or substantially identical subset of each focusing element's optical footprint, the domains being discrete in that no two subsets overlap and every point in each subset is closest to its respective focusing element. Each domain is divided into a number of discrete pixels equal to the number of viewpoint images.

Each viewpoint image is processed digitally, the number of pixels in each digitally processed viewpoint image being equal or proportionate to the total number of focusing elements that are reserved for this part of the device. The pixels in each digitally processed viewpoint image are distributed to the same location within each digitized domain, such that each location within each digitized domain is marked with the color of a pixel from one digitally processed viewpoint image, allowing for the device to project a different viewpoint image as the device is viewed at different angles.

Figure 7:
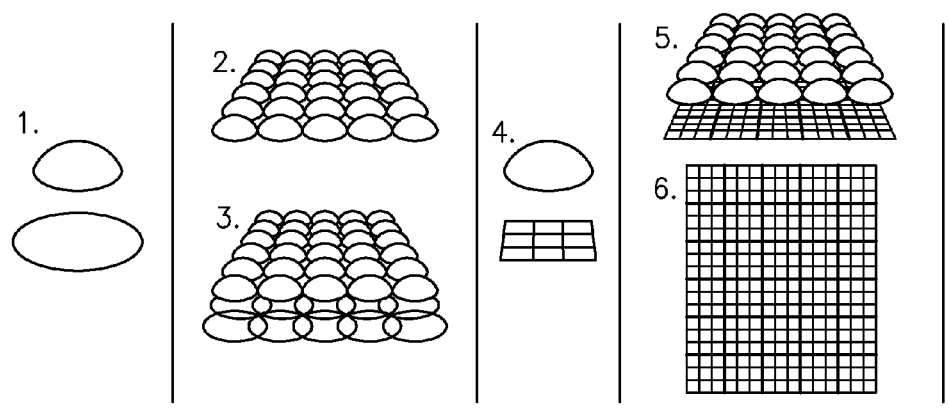
FIG. 7 illustrates, in a first frame, a lens with its optical footprint, in a second frame, a lens array, in a third frame, the lens array of the second frame with an array of each lenses' optical footprint, which lie on an image layer, in a fourth frame, the lens of the first frame with its domain in the form of a digitized domain, in a fifth frame, the lens array of the second and third frames shown with an array of digitized domains, and in a sixth frame, the array of digitized domains or raster grid.
Figure 8:
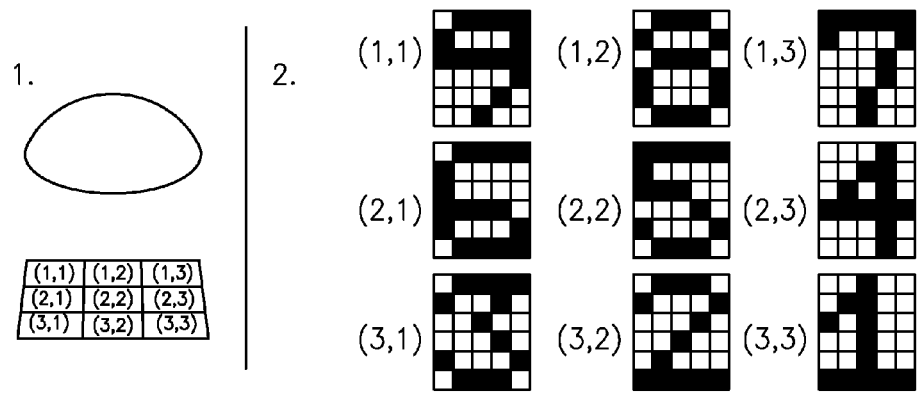
FIG. 8 illustrates, in a first frame, a lens and the lens' digitized domain, where an address has been assigned to each pixel in the digitized domain, and in a second frame, a collection of nine different viewpoint images, each of which has been assigned to an address that corresponds to one of the pixels in the digitized domain shown in the first frame.

A working example of the method for making the security device of the present invention is described below and shown in FIGS. 7-12. In the first frame of FIG. 7, a single lens and its optical footprint is shown. In the second frame, an array of such lens measuring six lenses tall and five lenses wide is shown, while in the third frame, the same lens array is shown in combination with the optical footprint of each lens, the optical footprints lying in an overlapping arrangement on an image layer. As previously noted, the term "domain" is defined by the subset of each optical footprint that lies closer to its respective lens than to any other lens. In accordance with the teachings of the present invention, the domain, which in this working example is substantially square in shape, is digitized. The fourth frame of FIG. 7 shows a single lens with a digitized domain, the digitized domain measuring three digitized domain (DD)-pixels tall by three DD-pixels wide. The resulting array of digitized domains is shown with an overlying array of lenses in the fifth frame of FIG. 7, and by itself in the sixth frame of FIG. 7. The array of digitized domains, which in this working example measures six DD-pixels tall and five DD-pixels wide, is also referred to as a raster grid.

The fact that there are nine pixels in each digitized domain means that a total of nine images can be prescribed to each domain. Each of these nine images, which are referred to as viewpoint images, can be seen from a different viewing angle or viewpoint. In this working example, each viewpoint image is a binary image (i.e., black or white only). Where there are thirty lenses in the lens array and thirty digitized domains in the image layer in this working example, each viewpoint image will contain exactly thirty pixels.

The technique of distributing viewpoint images to the raster grid is shown in FIGS. 8-12. In the first frame of FIG. 8, a single lens and its digitized domain is shown, the digitized domain indicating the address for each DD-pixel (e.g., (2,1) indicating $2^{nd}$ row, $1^{st}$ column, (3,3) indicating $3^{rd}$ row, $3^{rd}$ column). A collection of viewpoint images, each of which has been assigned to an address that corresponds to one of the DD-pixels in the digitized domain is shown in the second frame of FIG. 8. For example, the numeral 9 has been assigned to address (1,1) of the digitized domain, while the numeral 8 has been assigned to address (1,2) of the digitized domain.

Figure 9:
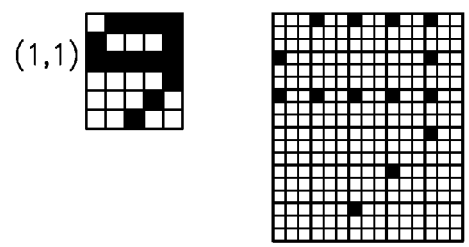
FIG. 9 illustrates how the image corresponding to the address (1,1) is distributed to the array of digitized domains or raster grid shown in the sixth frame of FIG. 7.
Figure 10:
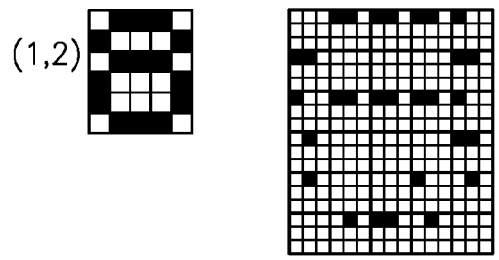
FIG. 10 illustrates how the images corresponding to the addresses (1,1) and (1,2) are distributed to the array of digitized domains or raster grid shown in the sixth frame of FIG. 7.
Figure 11:
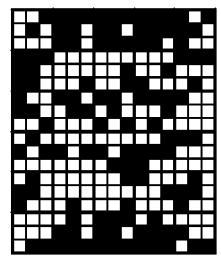
FIG. 11 depicts the raster grid after the nine different viewpoint images shown in the second frame of FIG. 8 have been distributed to the grid.

In FIG. 9, the image corresponding to address (1,1) (i.e., the numeral 9) is shown distributed to the raster grid, which lies on the image layer. Similarly, in FIG. 10, the images corresponding to addresses (1,1) and (1,2) (i.e., the numerals 8 and 9) are shown distributed to the raster grid. In FIG. 11, the image layer is shown after all nine viewpoint images have been distributed to the raster grid.

Figure 12:
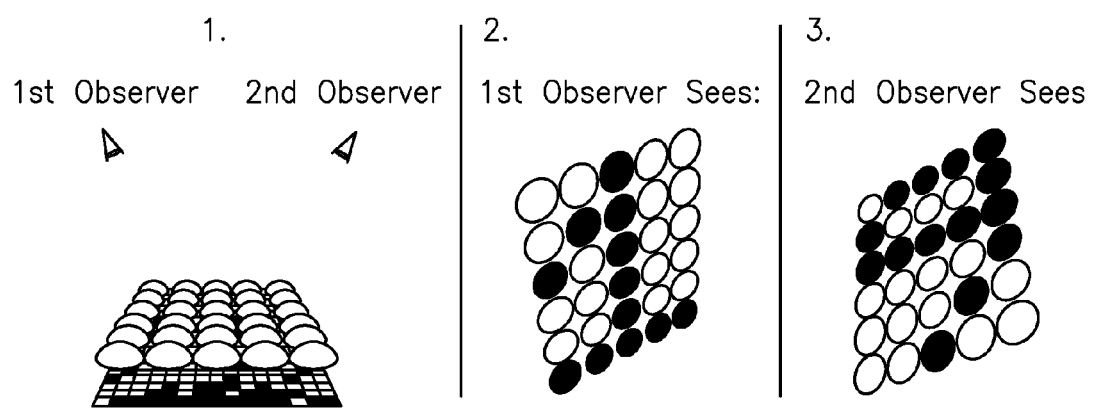
FIG. 12, in a first frame, is a cross-sectional view of an exemplary embodiment of the security device of the present invention, which employs the populated raster grid shown in FIG. 11, in a second frame, illustrates what an observer located closest to the top-left of the device would see when viewing the device, and in a third frame, illustrates what an observer located closest to the bottom-right of the device would see when viewing the device.

Upon proper placement of the lens array over the image layer (i.e., no unintentional skew angle in the lens array used to specify the raster grid), the resulting security device will project one or more viewpoint images, depending upon the angle of viewing. In particular, as an observer moves from one viewing angle to another relative to the security device, different viewpoint images will become visible. FIG. 12 shows in the first frame two observers who are looking at the inventive device from different locations as well as their relative observations in the second and third frames. In particular, in this example, the $1^{st}$ observer is far away, yet closest to the top-left of the device. This causes the light that is projected from DD-pixel at address (3,3) in each of the digitized domains to reach the 1st Observer. Consequently, the 1st Observer sees the viewpoint image that is associated with address (3,3), namely an image of the numeral 1. Similarly, the $2^{nd}$ observer is far away yet closest to the bottom-right of the device. This causes the light that is projected from DD-pixel at address (1,1) in each of the digitized domains to reach the $2^{nd}$ observer. Consequently, the 2nd observer sees the viewpoint image that is associated with address (1,1), namely an image of the numeral 9.

As will be readily appreciated by those skilled in the art, the resolution of the viewpoint images can be increased as the number of lenses increases due to the proportionate correspondence between the number of viewpoint image pixels and the number of lenses. Similarly, the number of viewpoint images can be increased if the number of viewpoint image pixels in the digitized domains increase.

Grayscale

In the previous section, simple viewpoint images that were binary in the sense that the viewpoint-pixels were either black or white were distributed into the image layer(s). The inventive security device, however, also has the ability to project very complex and detailed viewpoint images including abstract designs, shaded 3D models, photographs, and the like. The ability to project such viewpoint images is made possible by distributing grayscale (halftone) viewpoint images into the image layer(s).

In one such exemplary embodiment of the present invention, a raw or unprocessed image of a Utah teapot or Newell teapot, which is shown in FIG. 13, is used as the viewpoint image. This particular image is 160 pixels wide by 100 pixels tall and uses 255 shades of gray, which would require a lens array that is 160 lenses wide by 100 lenses tall. However, if one lens projects a different shade of gray than a neighboring lens, then they must have different shades of gray in their digitized domains. This means that in order to correctly project all 255 shades of gray, it would be necessary to put the correct shade of gray in the correct digitized domain-pixel in each of the lenses' digitized domains. This poses a problem because typically there is only one color "printed" on the image layer(s) at a time. If multiple colors (or shades of gray) are used, then each of these colors would have to be in register such that the printed pixels would end up in the same digitized domain-pixel in each lens optical footprint. It is difficult to keep such ultra-microprinting in register and so this presents a challenge.

The present invention avoids this type of registration requirement by using methods such as, for example, dithering and half-toning. In particular, in order to represent the teapot image using the algorithm described above, the required color palette is reduced by using techniques such as thresholding, dithering and down sampling, among other techniques known in the art. The resulting image, which is shown in FIG. 14, is a 160×100 pixel processed image of the teapot that uses only four shades of gray (not including white).

The four shades of gray may then be dithered to enhance the smooth transition from one level of gray to the other in the image. In particular, instead of using one lens per viewpoint image-pixel, a cluster of lenses or a lens cluster is used for each viewpoint image-pixel. FIG. 15 shows one way that four levels of gray (plus white) can be represented by a (2×2) cluster of lenses.

The processed teapot image is shown in FIG. 16 as a finished binary image, which is the final look of the teapot image and what essentially would be projected toward the specified viewpoint. The (160×100) pixel image no longer uses a lens array of size 160×100, but rather a 160×100 array of lens clusters where each lens cluster is a 2×2 array of lenses. In total that makes 320×200 lenses that represent the teapot image.

It is noted that any number of known algorithms (error diffusing, various dithering algorithms, edge enhancements, tone shading, etc.) may be incorporated to modify a raw image to produce a processed image. Additionally, the scheme used to implement the grayscale with the lens clustering does not have to be a constant. For example, there are four ways to arrange four lenses in a square to achieve a 25% grayscale, and each 25% gray pixel from a processed image could independently use one of these four schemes. As alluded to above, a preferred goal is to end up with a binary image that can be used to make one print pass for the image layer(s). The final binary image would then be distributed to the appropriate raster grid as previously described.

As evident from the above, for security devices with a single image layer, the viewpoint images can be anything at all that can be represented as a binary image. For security devices that may have multiple image layers (multiple colors, for instance), the viewpoint images can represent any sum of different colored binary images.

3D Images

In addition to allowing any arbitrary binary image to be projected as a viewpoint image, the inventive security device also allows for the projection of fully 3D images.

As is well known to those skilled in the art, binocular disparity refers to the difference in image location of an object seen by the left and right eyes, which results from the eyes' horizontal separation. The brain uses binocular disparity to extract depth information from 2D images in a process known as stereopsis.

As will be readily apparent to the reader, the array of digitized domains or raster grid of the present invention needs a minimum of two different images distributed within it in order for the left and right eyes to see different viewpoint images. By way of the present invention, these images are designed to be "related" in such a way that when the brain receives the two different 2D images from the left and right eyes, it will synthesize the depth information and produce a convincing 3D image in the brain.

Figure 17:
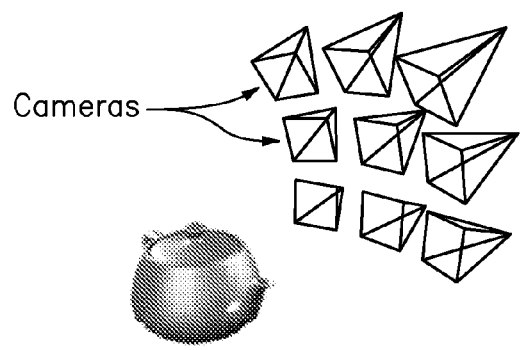
FIG. 17 is a pictorial representation of a virtual camera array taking snapshots of an object in the form of a Utah teapot or Newell teapot.
Figure 18:
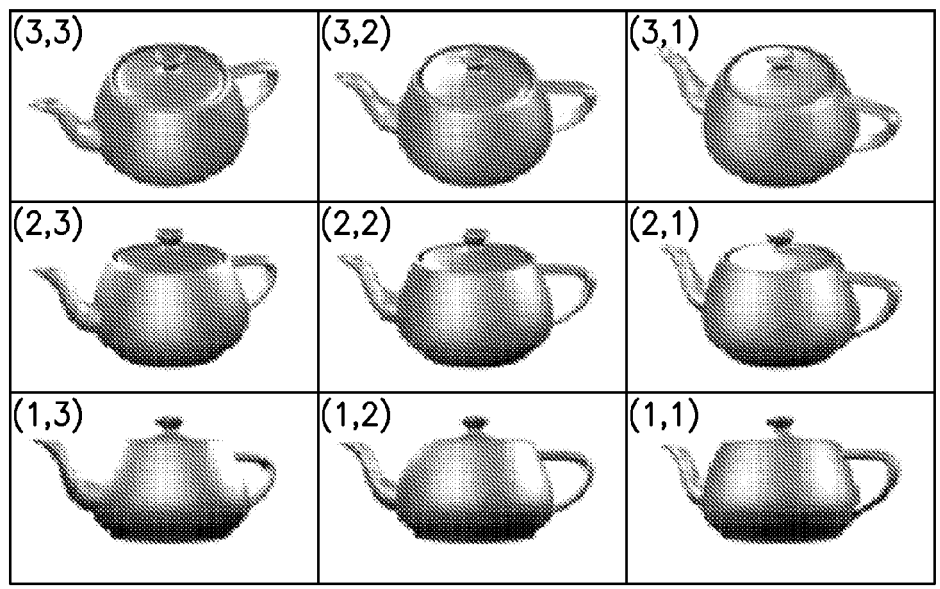
FIG. 18 is perspective view of six raw viewpoint images provided by the virtual camera array shown in FIG. 17.

The relationship between these viewpoint images can be achieved by modeling an object using one or more real cameras, or by modeling the object in a 3D graphics program (e.g., SKETCHUP®, 3DS MAX®, MAYA®, Blender, and DAZ Studio™ computer software, and the like), and then obtaining different raw viewpoint images by rendering the view of the object by a (virtual) camera from multiple positions. For example, in FIG. 17, a 3×3 array of virtual cameras, which corresponds in a one-to-one relationship to the 3×3 array of pixels for each digitized domain shown in the fourth frame of FIG. 7, is used to take snapshots of the Utah teapot or Newell teapot from each camera's own viewpoint. The resulting raw viewpoint images are shown in FIG. 18. Due to the one-to-one correspondence between the 3×3 array of virtual cameras and the 3×3 array of pixels for each digitized domain, each of these raw viewpoint images is tied to a specific digitized domain-pixel location in each digitized domain.

The images shown in FIG. 18 are numbered "upside down and backwards". This was done to make sure that the viewer sees the intended image when observing the device from a specified viewpoint. For example, suppose that an observer is looking straight on to the device, and that it is desired that the device would be projecting image (2,2) to the observer. If the observer moves to the right, then we would expect to see something like that in image (2,1). Therefore, as the observer moves to the right, the image that is seen changes from (2,2) to (2,1). However, the focal point of the convex refractive lens used in the previous examples would move to the left when the observer moves to the right. This is why the numbering system for the images in FIG. 18 seems backwards. This is consistent with the exemplary examples shown in FIGS. 8 and 12 as well. As will be appreciated by the reader, any such numbering system would need to be consistent with the optical behavior of the lenses.

Figure 19:
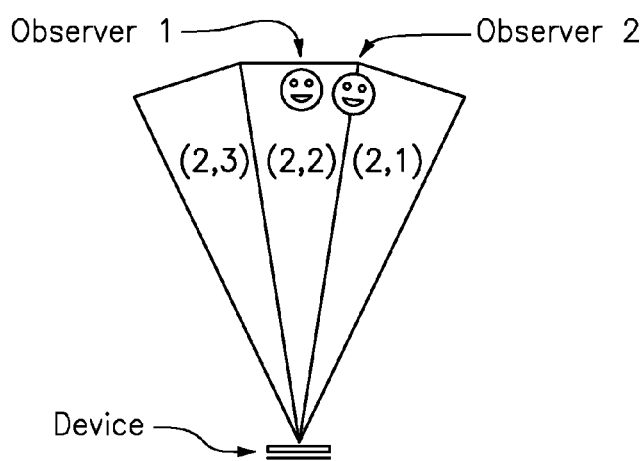
FIG. 19 is a simplified cross-sectional view of an exemplary embodiment of the security device of the present invention as well as a collection of fields of view of viewpoint images (2,3), (2,2) and (2,1) projected thereby.

As best shown in FIG. 19, the image layer(s) of the inventive security device will provide an observer with the information necessary to synthesize depth information. In particular, FIG. 19 provides a simplified cross section of an exemplary embodiment of the inventive device as well as a collection of fields of view of the different viewpoint images. The observer who sees (2,2) with both eyes is labeled "Observer 1", and the observer who sees (2,2) with one eye, and (2,1) with the other eye is labeled "Observer 2". The triangles in this figure represent the field of view in which one of the viewpoint images is projected. The Observers are assumed to be very far away from the device relative to the size of the lenses. If Observer 1 moves to the right slightly, then eventually the left eye will see image (2,2), and the right eye will see image (2,1). This provides Observer 1's brain with the information necessary to synthesize the depth information. Similarly, if Observer 1 moves to the left slightly, then the right eye will see image (2,2) and the left eye will see image (2,3). This also provides Observer 1's brain with two 2D images that can be used to synthesize depth information.

Figure 20:
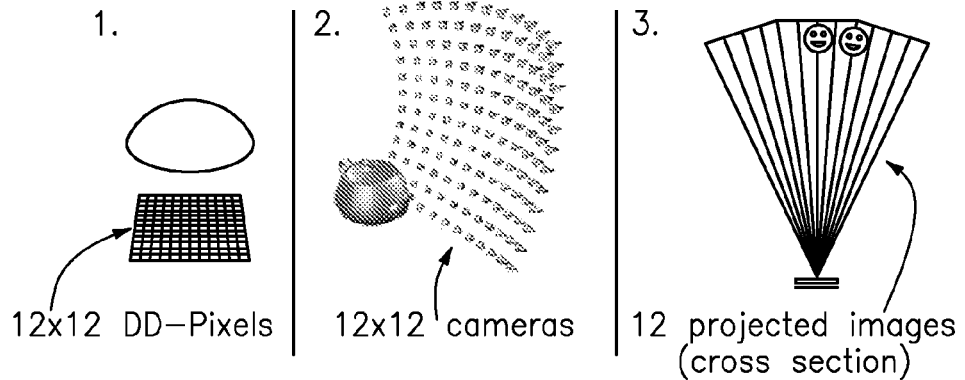
FIG. 20 illustrates, in a first frame, a lens with a 12×12 digitized domain, in a second frame, a pictorial representation of a 12×12 virtual camera array taking snapshots of a Utah teapot or Newell teapot, and in a third frame, a simplified cross-sectional view of an exemplary embodiment of the security device of the present invention as well as a collection of fields of view of twelve viewpoint images projected thereby.

As best illustrated in FIG. 20, as the resolution of the available print for the image layer(s) increases, the number of pixels that are possible for placement into the digitized domains also increases. Referring back to the above exemplary example, this means that the number of cameras can also increase to match the number of digitized domain-pixels, and the number of projected viewpoint images will increase. FIG. 20 shows in the first frame a new digitized domain in the form of a square grid made up of a 12×12 array of digitized domain-pixels. This means that 144 different viewpoint images can be represented by the associated array of digitized domains or raster grid. In the second frame of FIG. 20, an array of 144 (virtual) cameras looking at the teapot is shown, with each of the cameras located at a unique location relative to the teapot. These cameras form an array of 144 viewpoint images (not shown) each of which will be associated with one of the addresses in the array of digitized domains. In the third frame of FIG. 20, a cross section of the fields of view of the projected images, similar to FIG. 19, is shown. This frame illustrates the fact that when the same lens and domain arrays are used, but a greater number of digitized domain-pixels are used in the digitized domains, the field of view for each projected viewpoint image will be smaller, but the total field of view for the entire lens domain will be the same. In this example, both observers are now seeing in 3D. There is greater 3D resolution for this device than for the device in FIG. 19 in terms of the number of viewpoint images.

Figure 21:
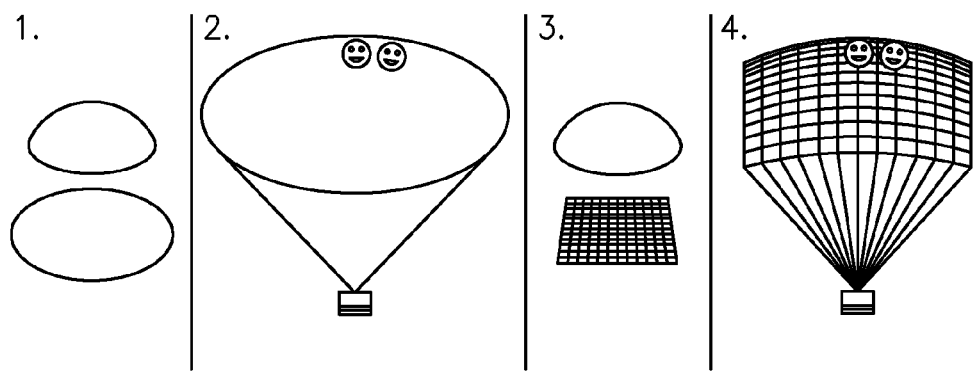
FIG. 21 illustrates, in a first frame, a lens with its optical footprint, in a second frame, the field of view of an exemplary embodiment of the inventive security device, in a third frame, the lens shown in the first frame with its digitalized domain, and in a fourth frame, the range of the exemplary embodiment of the inventive security device shown in the second frame.

One of the limitations inherent in the above examples, which is illustrated in FIG. 21, is the fact that the device's field of view is not the same as the field of view of all of the projected viewpoint images (i.e., its range). FIG. 21 shows in the first frame a lens and its respective optical footprint, which is the collection of all of the points on the image layer that can be focused upon by the lens. The field of view of the device, which as alluded to before is basically a solid angle in which the lenses project the entirety of their optical footprints, is shown in the second frame of FIG. 21. In the third frame of FIG. 21, a digitized domain is shown, the domain constituting a subset of the optical footprint that is closest to that particular lens. By definition, no two adjacent domains will ever overlap. It is possible, however, for optical footprints to overlap (see FIG. 7). Typically the domain will be a polygonal shape of some sort (e.g., square, hexagon, skewed hexagon, triangle, Penrose pentagon), and the digitized domain is an approximation of the geometry of the domain using pixels. In the fourth frame of FIG. 21, the field of view of all of the projected viewpoint images is shown. This is called the device's range. The range is not necessarily equal to the field of view of the device. The range need not be circular. In this example, the range is split up into a number of different sections, each of which is a subset of the field of view of a particular viewpoint image.

Figure 22:
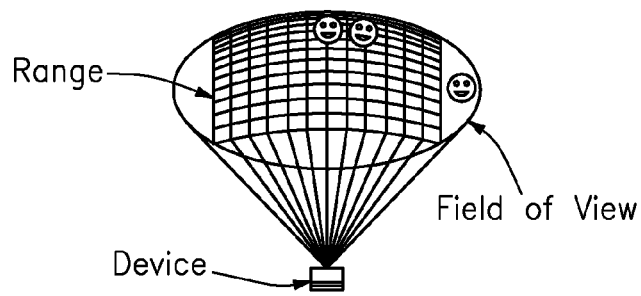
FIG. 22 illustrates the range of the inventive device as a subset of the device's field of view.

FIG. 22 illustrates what an observer sees who is outside of the device's range but inside the device's field of view. Such an observer, who is shown on the right side of FIG. 22, sees a viewpoint image that is the result of the lenses taking samples from points that are inside the domains of neighboring lenses. This so-called sampling is illustrated in FIG. 23, using a device that has the same digitized domain as the one in the first frame of FIG. 8.

Figure 23:
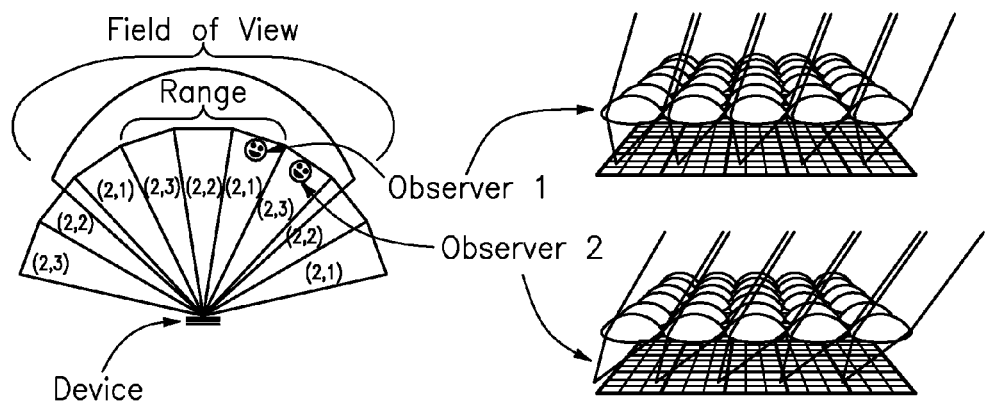
FIG. 23 illustrates what an observer sees when inside the device's field of view but either inside or outside of the device's range.

FIG. 23 illustrates the field of view of the lenses and three copies of the range. The range consists of the projections of viewpoint images (2,3), (2,2), and (2,1). In this illustration, the range has been repeated in a radial sense to show the periodicity of the device in terms of the way it projects viewpoint images. In this figure, Observer 1 sees viewpoint image (2,1), which is in the range, while Observer 2 sees viewpoint image (2,3), which is in the range of the neighboring lens.

No Snap

As described in detail above, there is a one-to-one correspondence between the number of digitized domain-pixels and the number of viewpoint images that the inventive security device can project. Keeping the same domain size, as the number of digitized domain-pixels increases, the field of view for each individual viewpoint image decreases, causing a greater likelihood that the left and right eyes of an observer will be presented with different images. If the viewpoint images are designed to have a certain relationship with one another, then the observer will see a 3D image. This sort of relationship can be formed, for example, by defining each viewpoint image to be the view of an object from a location that would correspond to the location of the observer as they observe the device. For example, the camera that is viewing the Utah teapot "straight on" should take a picture that will provide the viewpoint image that should be projected by the device and seen by an observer who views the device "straight on". Similarly, the camera that is viewing the Utah teapot "from the right" should take a picture that will provide the viewpoint image that should be projected by the device and seen by an observer who views the device "from the right". Considering FIG. 20, this means that there will be a total of 144 locations from which a camera will take a picture of an object, and a total of 144 distinct and small areas (the sum of which creates the entire range) from which an observer can see the device projecting a unique viewpoint image. Slight movements by the observer within this range guarantee that there was only slight movement of the camera when generating the pictures. However, if the observer moves outside of the range and looks at the device, from the perspective of the camera that was taking these pictures to begin with, a small movement by the observer across the border of the range will correspond to a large movement of the camera: the camera will have moved all the way to the other extreme. This creates a large discontinuity in what the observer sees that we call "snap". For the examples we have used thus far, snap is a consequence of the field of view of the device being larger than the range.

The inventive device, in an exemplary embodiment, is designed to project a 3D image that has full parallax in all directions. In this embodiment, however, "x-y" registration does not exist between the lenses and their respective domains.

In the previous examples, it has been assumed that "x-y" registration exists between the lenses and their respective domains. In other words, when the viewer looks at the device from a distant vantage point that is perpendicular to the surface of the device then each lens should sample the point that is exactly in the center of the digitized domain. In reality, the lens array and image layer(s) are formed separately and it is therefore difficult to ensure such registration. In fact, x-y placement of the lens array with respect to the image layer may be somewhat random.

Figure 24:
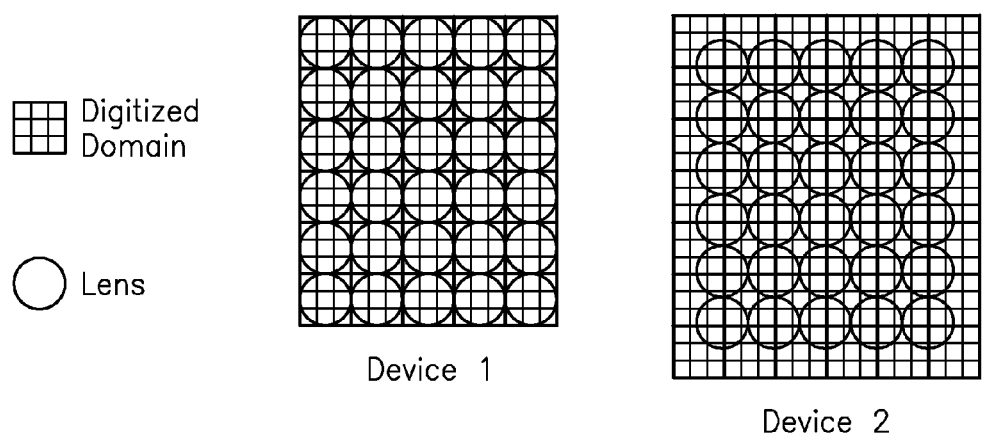
FIG. 24 illustrates, in a first frame, an embodiment of the inventive device in which the array of lenses and the array of digitized domains are in register, and in a second frame, an embodiment in which the arrays are not in register.

Device 1 shown in FIG. 24 will result in the range being projected in a direction that is perpendicular to the surface of the device with snap occurring when the device is viewed from high angles. This is the ideal scenario for a device such as the one that was previously described and projects a static 3D object. However, with equal likelihood, current manufacturing processes will result in something like device 2, where the boundary between digitized domains lies directly beneath each lens. This will result in a snap of the 3D image when an observer is looking at the device from a perpendicular location. The range (and copies of the range) are being projected in directions that are only seen at awkward viewing angles. This is undesirable.

In the exemplary embodiment described below, the inventive security device projects images having no snap. In eliminating snap, the requirement for lens to domain registration is no longer required, and the manufacturability of such devices is enabled using current techniques.

Figure 25:
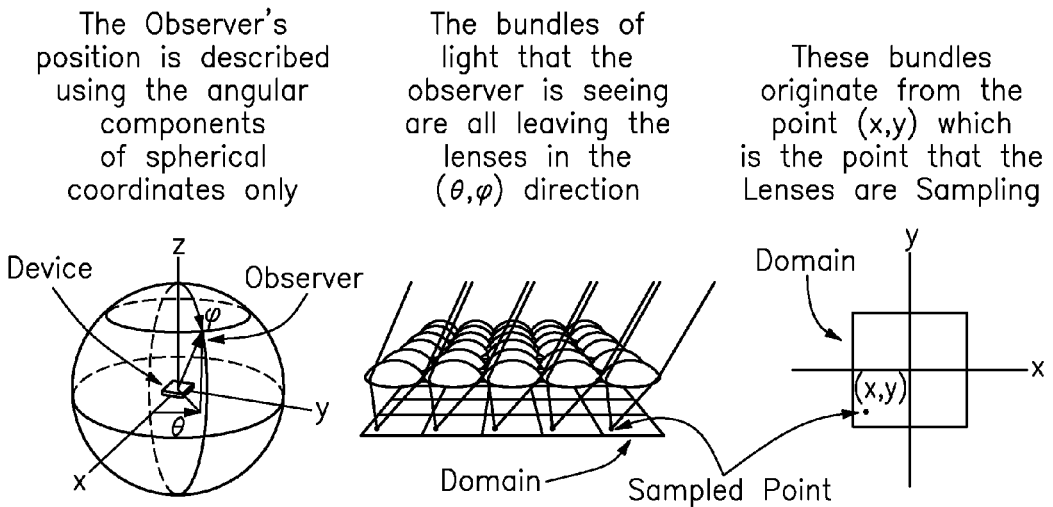
FIG. 25 illustrates the statement that the viewpoint of an observer (expressed as $(\theta,\phi)$) determines the location that the lenses are sampling within a domain (expressed as (x,y)), and the projected viewpoint image that the observer sees (expressed as a matrix-valued (or image-valued) function of the sampling location called image (x,y)

The mathematical foundation that was used by the present inventors to design exemplary embodiments of the security devices of the present invention that have 3D and other effects, but no snap, was based on the following statement, which is illustrated in FIG. 25:

There is a one-to-one correspondence between an observer's viewpoint, expressed as $(\theta,\phi)$, the location that the lenses are sampling within a domain, expressed as (x,y), and the projected viewpoint image that the observer sees, expressed as a matrix-valued (or image-valued) function of the sampling location called image (x,y).

Because the assumption was made that the observer is 'very far' from the inventive device, the location of the observer was only given in terms of its angular spherical coordinates, and not the radial component. Ultimately this $(\theta,\phi)$ coordinate got mapped to an (x,y) coordinate, which is the input to the image-valued function that provides the viewpoint image.

Figure 26:
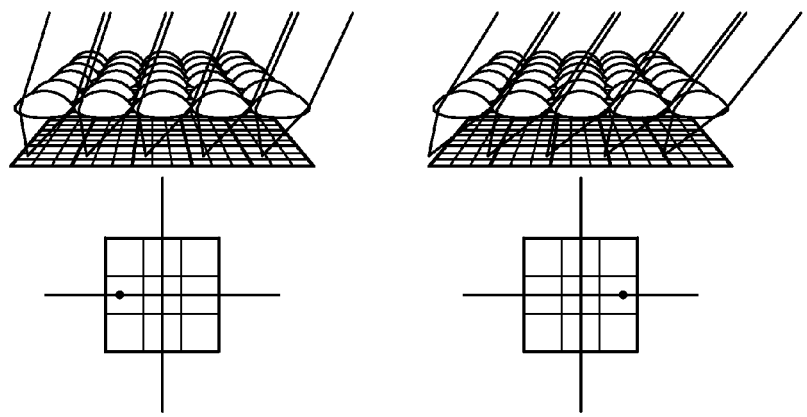
FIG. 26 illustrates how when an observer views the inventive device from a sufficiently high angle (i.e., φ becomes large), the lenses will all have sampling points that are in the domain of a neighboring lens.

As shown in FIG. 23, if an observer views the inventive device from a sufficiently high angle (i.e., $\phi$ becomes large) then the lenses will all have sampling points that are in the domain of a neighboring lens. Due to the substantially periodic nature of the device, it was said that the sampled point (x,y) simply 'jumped' from one side of the domain to the other. This is illustrated in FIG. 26. The domain therefore is literally a two-dimensional polygonal region in which any point in that region is mapped to an image. Such a domain will hereinafter be referred to as a fundamental domain.

Figure 27:
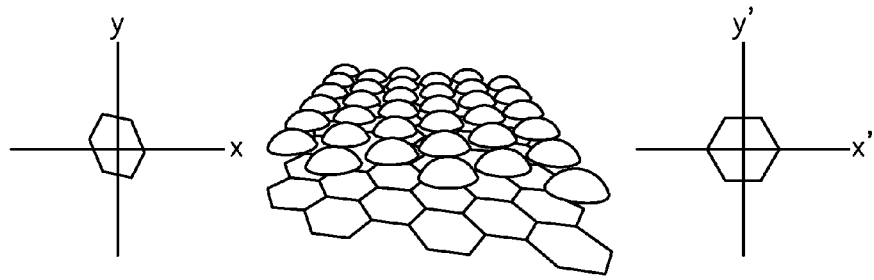
FIG. 27 illustrates another embodiment of the inventive security device in which each domain in the array of digitized domains is a skewed six-sided polygon or hexagon.

In all of the previous examples, the fundamental domain has been a square. However, a much more general shape is a six-sided polygon or hexagon, as shown in FIG. 27. In this exemplary embodiment, skewed hexagons tile the image layer plane(s), and represent a more general fundamental domain than squares. Moreover, it is possible to map a skewed hexagon, which is topographically equivalent to a regular hexagon, to a regular hexagon without loss of generality.

Figure 28:
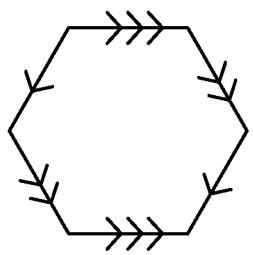
FIG. 28 is a planar view of one of the hexagons shown in FIG. 27, where the edges are marked with arrows to indicate the edges that 'meet up' when the image layer is tiled with these hexagons.

In FIG. 28, the edges of this fundamental domain are marked with arrows to indicate which edges line up when the image layer plane is tiled with this hexagon to form a periodic structure on the image layer(s).

Figure 29:
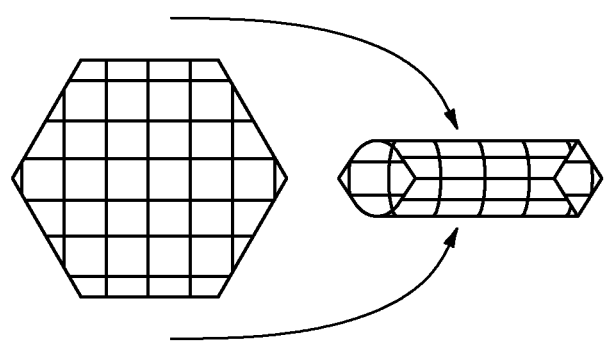
FIG. 29, in a first frame, is a planar view of a digitized hexagonal domain, and in a second frame, shows the hexagonal domain "rolled up" about the x-axis such that the top side meets up with the bottom side to form a tube.
Figure 30:
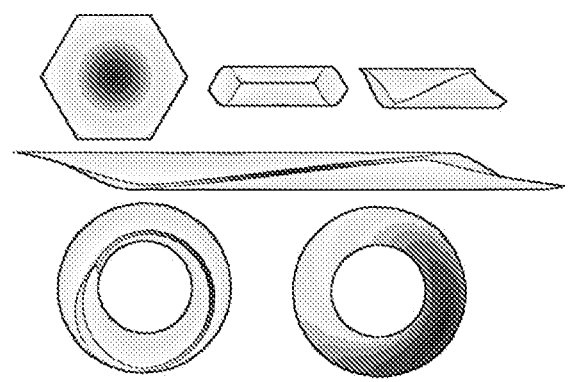
FIG. 30 is a series of images where a hexagonal domain is formed into a twisted torus, demonstrating that a hexagonal domain is topographically equivalent to a torus.

Having identified skewed hexagons as the fundamental domains, and having tiled the image layer plane with these hexagons, the present inventors then identified mathematical functions of x and y that are continuous even when x and y are 'wrapped back' onto the fundamental domain. To illustrate that this was possible, the present inventors considered "rolling" a hexagon into a tube. In particular, FIG. 29 shows a six-sided fundamental domain being "rolled up" about the x-axis such that the top side meets up with the bottom side to create a 'tube'. Next, the tube was "rolled up" about a perpendicular axis such the left and right sides met up with each other properly. In the case of this six-sided fundamental domain, a "twist" had to be introduced in order for the top-left edge to meet up with the bottom-right edge, and the top-right edge to meet up with the bottom-left edge, respectively. The final shape was a twisted torus. The process for forming the twisted torus from the hexagon is shown in FIG. 30, with the process helping one to visualize the fact that the hexagonal fundamental domain is topographically equivalent to a torus.

By "continuous" coloring of the twisted torus and then unwrapping, the present inventors discovered that there can be any number of continuous mathematical scalar or two-dimensional functions on the fundamental domain that remain continuous when the fundamental domain is repeated in the spatially periodic sense.

Images were then made or modified using these continuous mathematical scalar functions. These images serve as the image-valued function described above.

Figure 31:
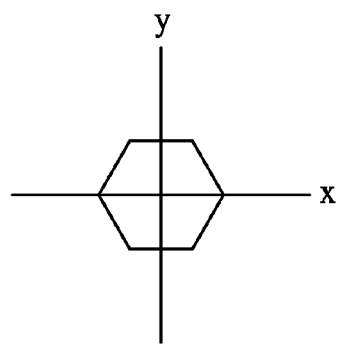
FIG. 31 is a planar view of a domain in the form of a regular hexagon centered at (0,0), with six vertices located one unit of distance from the origin.

By way of an exemplary example, a scalar function was applied to the fundamental domain shown in FIG. 31, which is a region on the xy plane. Specifically, the fundamental domain was a regular hexagon centered at (0,0), with its six vertices located one unit of distance from the origin. The present inventors have discovered that one way to avoid snap is to make sure that when such a scalar function is applied to repeated copies of the fundamental domain, the result is continuous. The following is an example of such a scalar function:

$$d = \sin\left(\frac{4}{3}(2\pi x)\right)$$

Figure 32:
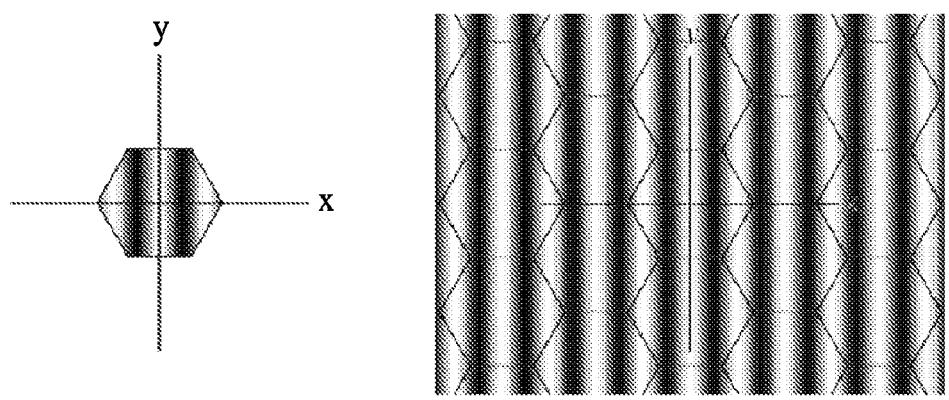
FIG. 32, in a first frame, is a planar view of the domain shown in FIG. 31 after a continuous scalar function has been applied, while in the second frame, this domain is shown after having been repeated spatially.

In the first frame of FIG. 32, the fundamental domain of FIG. 31 is shown after the scalar function has been applied to it, while in the second frame, spatially repeated copies of the fundamental domain (after the scalar function has been applied) is shown. As can be readily seen in the second frame of FIG. 32, the plane formed by the repeated tiling of the fundamental domain is covered with a continuous function. In other words, no matter what direction the sampling point moves in, there is never an abrupt change in the value of d.

The scalar value d was then used to alter or define an image. In one exemplary example, this scalar value d was used as a scaling factor in the image. The resulting security device had an image that got larger and smaller as it was tilted from the left to the right.

The above exemplary example is a relatively simple example of how the fundamental domain can have a scalar function applied to it that allows for the tiling of the fundamental domain to be continuous. The values of the function are then used to define or alter an image in some way; in this case the value of the function was used to scale an image. In general, multiple functions can be used simultaneously to alter different aspects of an image. Any number of functions can be used in a single design, and each of these functions can affect the design in any way imaginable. Any quantifiable parameter in an image can be adjusted through the use of these functions in order to create a very dynamic design. For example, one function can control the rotation of an image while another affects the lighting. Multiple objects can grow and shrink in size independently of one another using multiple functions. The functions can be horizontal sinusoids (like the example above), or vertical sinusoids.

The functions can be defined in terms of polar coordinates to have other functionality. Furthermore, any linear combination of these functions can be combined to give very complex behavior of objects in the designs. Careful design of these functions and their associated alterations that they cause on the images/objects can form 3D effects that are not possible with other methods.

Figure 33:
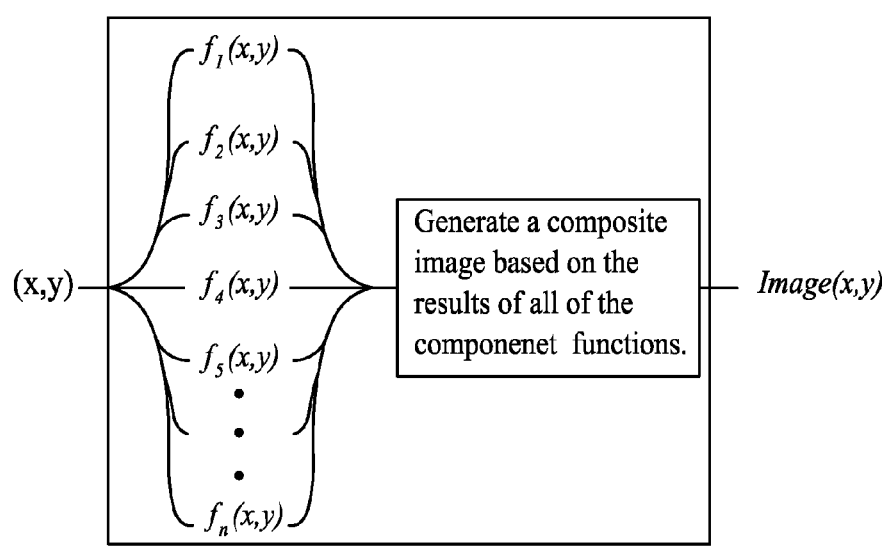
FIG. 33 illustrates a general process in which multiple functions can be defined on the domain; each of these functions altering or defining an image in an independent matter.

As outlined in FIG. 33, multiple functions can be defined on the fundamental domain. Each of these functions can alter or define an image in an independent manner.

Figure 34:
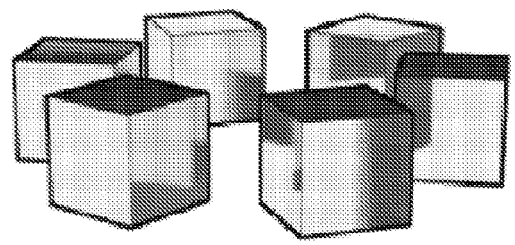
FIG. 34 provides a perspective view of an exemplary design in the form of a collection of identical cubes that rotate when the viewer's perspective is changed, with the cubes having reflections, 'toon' outlines, shading, etc.

In a further exemplary example, a design was made that was represented by a collection of identical cubes that rotated when a viewer's perspective changed. These cubes, which have reflections, 'toon' outlines, shading, etc., are shown in FIG. 34.

Figure 35:
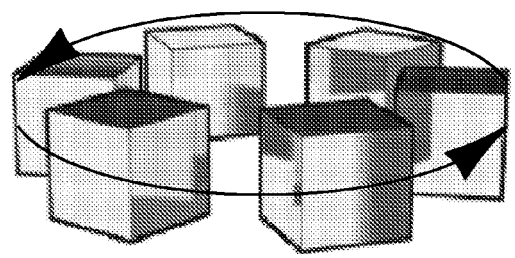
Figure 36:
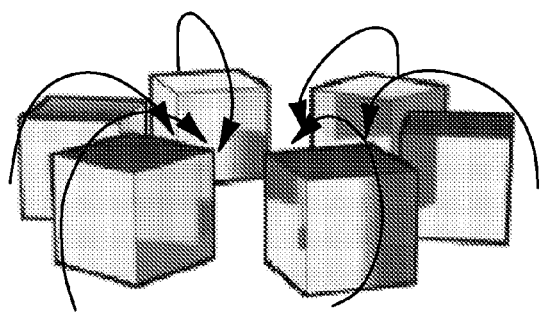
FIG. 36 illustrates how the cubes move as the view moves up and down.

As illustrated in FIG. 35, as the viewer moves from left to right, the cubes rotate around a vertical axis. In this figure, the arrows indicate the direction of movement for the cubes as the viewer's perspective changes horizontally (left-right tilting). As the viewer moves up and down, the cubes rotate around their own axis, towards the center of the cube arrangement. This is as if they were doing somersaults towards or away from the center of the arrangement. This is illustrated in FIG. 36. In this figure, the arrows indicate the direction of movement for the cubes as the viewer's perspective changes vertically (towards-away tilting).

In order to make these types of movements snap-free, each cube's full range of motion must be cyclical in some visually logical way.

If the full range of movement spans 60 degrees (360/6) for the left-right movement then each cube will move to the position of its neighbor, and the result at the end of this movement will be indistinguishable from the beginning. This 60 degree number works because there are six cubes equally distributed around a circle.

If the full range of movement spans 90 degrees for the towards-away movement, then each cube will have done a quarter somersault, and it will be indistinguishable from a cube that has not moved at all. This 90 degree number works because a cube has 90 degree rotational symmetry along an axis normal to one of its faces.

Figure 37:
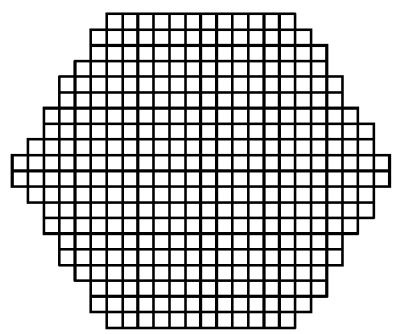
FIG. 37 provides a digitized domain made up of an arrangement of 360 squares that approximate a hexagon.
Figure 38:
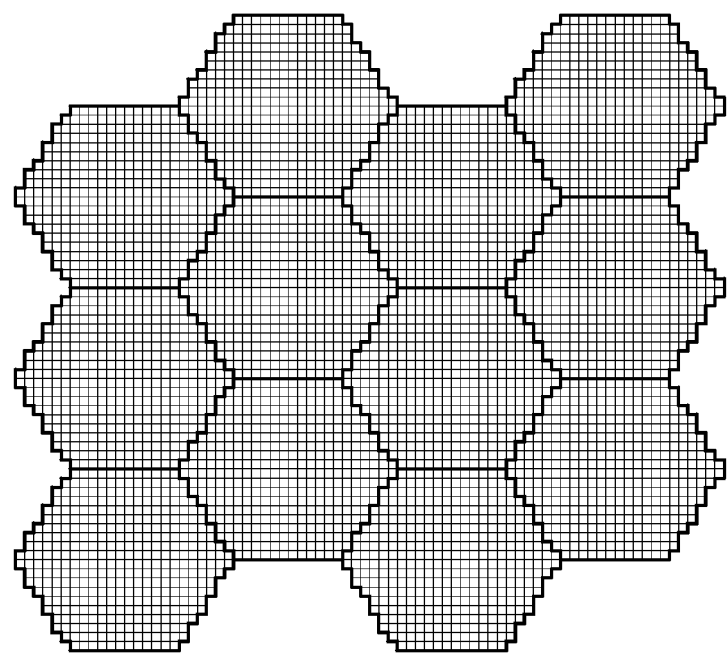
FIG. 38 illustrates how the digitized domain of FIG. 37 can be used to completely tile the image layer plane, with no gaps between digitized domain-pixels and no overlapping digitized domain-pixels.

For this exemplary example, the digitized domain shown in FIG. 37 was used. This domain was made up of an arrangement of 360 squares that approximated the shape of a hexagon. In other words, this domain has 360 digitized domain-pixels representing a total of 360 unique viewpoint images. As shown in FIG. 38, this hexagon effectively tiles the image layer plane. In other words, there are no gaps between digitized domain-pixels, and no overlapping digitized domain-pixels. In this figure, the bold line is drawn simply to help show the border between hexagons. Each of the squares shown in this figure could have been made into rectangles in such a way that the resulting pitches in the array of approximating hexagons exactly matched the desired lens that were to be used.

Figure 39:
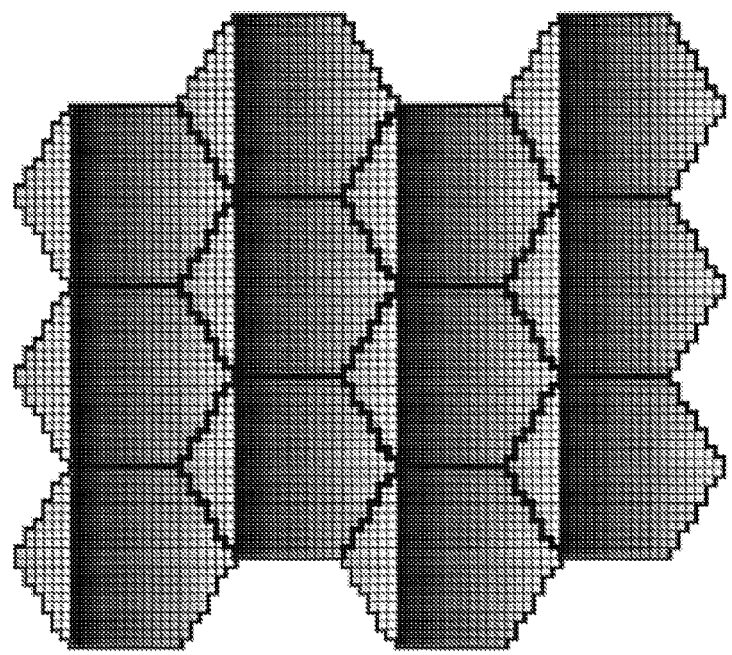
FIG. 39 provides the array of digitized domains shown in FIG. 38 after the linear function, f1, has been applied to each hexagonal domain, this function sweeping from 0 (white) to 60 (black) as one moves from right to left across the hexagonal domains.

Two twisted-torus symmetric functions were then chosen that could be used to map the perspective of the viewer to parameters in the images. These functions, which were implicitly defined above, include a first function f1, to go from 0 to 60 degrees as the viewer moves left-right, and a second function f2, to go from 0 to 90 degrees as the viewer moves up-down. These two functions are both simple linear functions. The first linear function f1 applied to the hexagon, is shown in FIG. 39. This function sweeps from 0 (white) to 60 (black) as you go from right to left across the hexagons.

Figure 40:
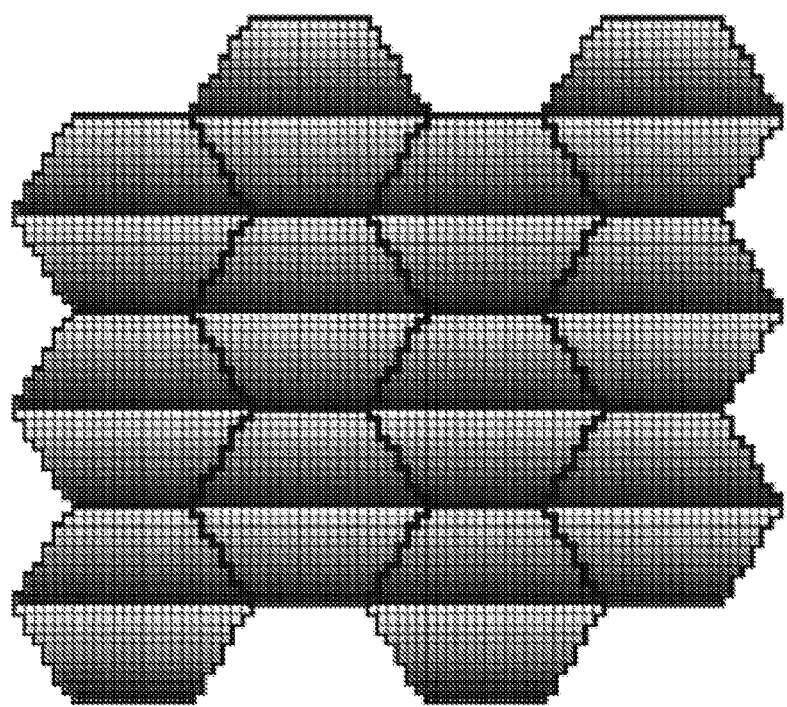
FIG. 40 provides the array of digitized domains shown in FIG. 38 after the linear function, f2, has been applied to each hexagonal domain, this function sweeping from 0 (white) to 90 (black) twice as one moves from the top of a hexagon to the bottom of a hexagon.

The second function f2 applied to the hexagon, is shown in FIG. 40. This function sweeps from 0 (white) to 90 (black) twice as you go from the top of a hexagon to the bottom of a hexagon.

It is noted here that each hexagon in FIG. 39 is identical, and that each hexagon in FIG. 40 is identical. Furthermore, the functions run 'smoothly' in a horizontal sense from hexagon to hexagon vertically in FIG. 39, and horizontally in FIG. 40. There is an abrupt 'jump' between each function, f1 and f2, which can be seen as a hard transition from white to black. However, the symmetry of the objects that are being controlled by these functions actually hides this functional discontinuity. This is because when the cubes are rotated (in the sense of FIG. 35) by 60 degrees, they end up in an identical position as when they started. Similarly, when the cubes are rotated (in the sense of FIG. 36) by 90 degrees, they end up in an identical position as when they started.

Viewpoint images were then generated for this particular design. As noted above, for each digitized domain-pixel in FIG. 37, there will an associated viewpoint image that will be revealed when the observer looks at the device from a particular viewing angle. This means that a total of 360 viewpoint images must be generated (because there are 360 digitized domain-pixels in FIG. 37). For each of these pixels, a value for f1 and f2 was calculated, these values determining the rotational position of the cubes in FIG. 34. The amount of rotation in FIG. 35 was determined by f1 and the amount of rotation in FIG. 36 was determined by f2. Once the cubes were in place for a given digitized domain-pixel, a viewpoint image was rendered (or a photograph taken). In either case, the resulting image was processed using typical image processing techniques to make a grayscale image with a known number of 'levels' of grayscale, and a number of pixels that is equal to the number of lenses divided by the number of levels of grayscale.

Examples of images that work well with such a mathematical definition include, but are not limited to: hypotrochoid and hypocycloids; epitrochoid and epicycloids; lissajous curves; curves generated by harmonographs and harmonograph-like processes; ruled surfaces; artistically generated curves, and algorithms performed on them; caustics, and collections of ray-traced paths; and parametrically definable families of curves.

Generally speaking, the security device of the present invention may be prepared using the variety of materials and fabrication techniques disclosed in U.S. Pat. No. 7,333,268 to Steenblik et al., U.S. Pat. No. 7,468,842 to Steenblik et al., and U.S. Pat. No. 7,738,175 to Steenblik et al., all of which are fully incorporated herein by reference as if fully set forth herein.

The inventive security device may be used in the form of, for example, a sheet material for use in making, for example, banknotes, passports, and the like, or it may adopt a thicker, more robust form for use as, for example, a base platform for an ID card, high value or other security document. The inventive device may also be used in the form of a security strip, thread, patch, or overlay and mounted to a surface of, or at least partially embedded within a fibrous or non-fibrous sheet material (e.g., banknote, passport, ID card, credit card, label), or commercial product (e.g., optical disks, CDs, DVDs, packages of medical drugs), etc., for authentication purposes.

When used in the form of a base platform for an ID card, high value or other security document, the base diameter of focusing elements in the form of, for example, refractive or reflective lenses is preferably less than about 50 microns, preferably from about 5 to about 30 microns, and more preferably from about 10 to about 25 microns, while the total thickness of the inventive device is preferably less than or equal to about 3 millimeters (mm) including (but not limited to) thicknesses: ranging from about 1 to about 3 mm; ranging from about 500 microns to about 1 mm; ranging from about 200 to about 500 microns, ranging from about 50 to about 199 microns, and of less than about 50 microns.

When used in the form of a security strip, thread, patch, or overlay, the base diameter of focusing elements in the form of, for example, refractive or reflective lenses is preferably less than about 50 microns, preferably from about 5 to about 30 microns, and more preferably from about 10 to about 25 microns, while the total thickness of the inventive device is preferably less than about 50 microns (more preferably, less than about 45 microns, and most preferably, from about 10 to about 40 microns).

The security strips, threads, patches and overlays may be partially embedded within or mounted on a surface of a document. For partially embedded strips and threads, portions thereof are exposed at the surface of the document at spaced intervals along the length of the strip or thread at windows or apertures in the document.

The inventive device may be at least partially incorporated in security papers during manufacture by techniques commonly employed in the papermaking industry. For example, the inventive device in the form of a strip or thread may be fed into a cylinder mold papermaking machine, cylinder vat machine, or similar machine of known type, resulting in total or partial embedment of the strip or thread within the body of the finished paper.

The security strips, threads, patches and overlays may also be adhered or bonded to a surface of a document with or without the use of an adhesive. Bonding without the use of an adhesive may be achieved using, for example, thermal welding techniques such as ultrasonic welding, vibration welding, and laser fusing. Adhesives for adhering the inventive devices to a surface of a document may be one of hot melt adhesives, heat activatable adhesives, pressure sensitive adhesives, and polymeric laminating films. These adhesives are preferably crosslinkable in nature, such as ultraviolet (UV) cured acrylic or epoxy, with crosslinking achieved while the adhesive is in the melt phase.

In another contemplated embodiment, the inventive device forms part of a label construction containing a transparent or translucent adhesive (i.e., the transparent thermoplastic material layer). The inventive device may be placed on the inside of a package, so that the synthetic images remain visible. In this embodiment, the base diameter of the focusing elements is preferably less than about 50 microns, preferably from about 5 to about 30 microns, and more preferably from about 10 to about 25 microns, while the total thickness of the inventive device is preferably less than about 200 microns (more preferably, less than about 75 microns, and most preferably, from about 10 to about 50 microns).

While various embodiments of the present invention have been described above, it should be understood that they have been presented by way of example only, and not limitation. Thus, the breadth and scope of the present invention should not be limited by any of the exemplary embodiments.

What is claimed is:

1. A security device for projecting a collection of synthetic images, which comprises: a collection of focusing elements, with each focusing element having an optical footprint; and at least one image layer, the collection of focusing elements and the at least one image layer together projecting a different image as the device is viewed at different angles, wherein, the at least one image layer is made up of an array of discrete digitized domains, each domain constituting an identical subset of each focusing element's optical footprint, the domains being discrete in that no two subsets overlap and every point in each subset is closest to its respective focusing element, each domain being divided into a number of discrete pixels equal to the number of images, wherein, each image is processed digitally, the number of pixels in each digitally processed image being equal or proportionate to the total number of focusing elements, the pixels in each digitally processed image being distributed to the same location within each digitized domain, such that each location within one digitized domain is marked with the color of a pixel from a different digitally processed image, allowing for the device to project a different image as the device is viewed at different angles.

2. The security device of claim 1, which projects a collection of grayscale or halftone synthetic images, wherein each image is a grayscale image with a reduced color palette, and wherein a cluster of focusing elements is used for each image pixel.

3. The security device of claim 1, which projects a collection of three-dimensional synthetic images, wherein the array of discrete digitized domains has pixels from two or more different digitally processed images distributed within it, the images including a certain binocular disparity as viewed from a first observation direction.

4. The security device of claim 1, which projects a collection of synthetic images that have no snap, wherein each distributed image is a composite image prepared by using one or more continuous mathematical scalar functions to define or alter a quantifiable parameter in the image.

5. The security device of claim 1, which projects a collection of synthetic images selected from the group of grayscale or halftone synthetic images, three-dimensional synthetic images, synthetic images that have no snap, and combinations thereof.

6. A computer-implemented method for producing a security device for projecting a collection of synthetic images, wherein the security device is made up of a collection of focusing elements in the form of a focusing element sheet, each focusing element having an optical footprint; and at least one image layer, the focusing elements and the at least one image layer together projecting a different viewpoint image as the device is viewed at different angles, the method comprising:

(a) forming the at least one image layer by:
  (i) compiling a collection of different raw viewpoint images with each raw viewpoint image prescribing what an observer should see when viewing the security device from a given angle;
  (ii) choosing a domain for each focusing element in the focusing element sheet, and arranging the domains in the form of a grid on or within the at least one image layer, the domains constituting identical subsets of each of the focusing element's optical footprints such that no two subsets overlap and every point in each subset is closest to its respective focusing element once the at least one image layer is placed in a focal plane of the collection of focusing elements, wherein exact registration between the domains and the focusing elements is not required;
  (iii) digitizing each chosen domain by dividing each domain into a number of discrete pixels, which will each represent a portion of a different viewpoint image, the number of pixels in each digitized domain being equal to the number of different viewpoint images, the digitized domains forming a raster grid;

(iv) digitally processing each of the different raw viewpoint images to form binary images, wherein the number of pixels in each digitally processed viewpoint image is equal to, or proportionate to, the total number of focusing elements in the focusing element sheet that will be used to represent the desired complete image;

(v) distributing the collection of different processed viewpoint images into the raster grid by marking each digitized domain pixel with the color of the corresponding viewpoint image pixel through a process called 'distribution', which involves assigning an address to each pixel in each digitized domain, and then assigning one image to each pixel having the same address in each digitized domain, such that each location within one digitized domain will be marked with the color of a pixel from a different processed viewpoint image; and (b) placing the formed image layer or layers in a focal plane of the focusing element sheet.

7. A security device prepared in accordance with the computer-implemented method of claim 6.

8. The computer-implemented method of claim 6, which produces a security device that projects a collection of grayscale or halftone synthetic images, wherein each raw viewpoint image is a raw grayscale or halftone viewpoint image, wherein the raw viewpoint images are modified by reducing the number of shades of gray in each image's color palette, optionally dithering the remaining shades of gray in each image's color palette, and then representing each such processed viewpoint image as a finished binary image, wherein after distributing the collection of different finished binary images into the raster grid, a cluster of focusing elements is used for each viewpoint image-pixel.

9. The computer-implemented method of claim 6, which produces a security device that projects a collection of three dimensional synthetic images, wherein the compiling step when forming the at least one image layer involves modeling an object in a 3D-graphics rendering program and obtaining different raw viewpoint images of the object by rendering views of the object using a camera at multiple positions, a one-to-one correspondence existing between the number of views rendered by the camera and the number of pixels in each digitized domain.

10. The computer-implemented method of claim 6, which produces a security device that projects a collection of synthetic images that have no snap, the method further comprising: determining mathematical scalar functions of x and y that are continuous; applying one or more such mathematical scalar functions to copies of the domain to obtain one or more scalar values, the domain constituting a region on the xy plane that has been repeated in a spatially periodic sense; and using the one or more scalar values to define or alter a quantifiable parameter in the collection of viewpoint images distributed to the domains, thereby generating composite viewpoint images.

11. The computer-implemented method of claim 6, which produces a security device that projects a collection of synthetic images selected from the group of grayscale or halftone synthetic images, three-dimensional synthetic images, synthetic images that have no snap, and combinations thereof.

12. The computer-implemented method of claim 10, wherein the mathematical scalar functions of x and y are continuous even when x and y are wrapped back onto the domain.

13. The computer-implemented method of claim 10, wherein the domain is a regular hexagon centered at (0,0), with its six vertices located one unit of distance from the origin, wherein the one or more scalar functions is:

$$d = \sin\left(\frac{4}{3}(2\pi x)\right),$$

wherein scalar value d is used as a scaling factor in the image.

14. The computer-implemented method of claim 10, wherein the collection of synthetic images is a collection of identical cubes, wherein the domain is an arrangement of 360 squares that approximate the shape of a hexagon, wherein the one or more scalar functions is a first and a second twisted-torus symmetric function (f1, f2), wherein the first function f1 sweeps from 0 to 60 degrees as a viewer moves left-right, and the second function f2 sweeps from 0 to 90 degrees as a viewer moves up-down.

15. A sheet material made from the security device of claim 1.

16. A sheet material having opposing surfaces and comprising at least one security device of claim 1, that is either mounted on, or embedded within, a surface of the sheet material, or partially embedded within the sheet material.

17. A base platform made from the security device of claim 1.

18. A base platform having opposing surfaces and comprising at least one security device of claim 1, that is either mounted on, or embedded within, a surface of the base platform, or partially embedded within the base platform.

19. A document made from the sheet material of claim 15.

20. A document made from the base platform of claim 17.

21. A sheet material made from the security device of claim 7.

22. A sheet material having opposing surfaces and comprising at least one security device of claim 7, that is either mounted on, or embedded within, a surface of the sheet material, or partially embedded within the sheet material.

23. A base platform made from the security device of claim 7.

24. A base platform having opposing surfaces and comprising at least one security device of claim 7, that is either mounted on, or embedded within, a surface of the base platform, or partially embedded within the base platform.

25. A document made from the sheet material of claim 21.
26. A document made from the sheet material of claim 16.
27. A document made from the sheet material of claim 22.
28. A document made from the base platform of claim 23.
29. A document made from the base platform of claim 18.
30. A document made from the base platform of claim 24.

* * * * *